Dec. 6, 1960 R. W. SPENCER ET AL 2,963,670

SUPPORTS FOR MAGNETIC CORES

Filed May 12, 1954 2 Sheets-Sheet 1

INVENTORS
RICHARD W. SPENCER
THEODORE H. BONN

BY [signature]

ATTORNEY

SUPPORTS FOR MAGNETIC CORES
Filed May 12, 1954 2 Sheets-Sheet 2
FIG. 4.
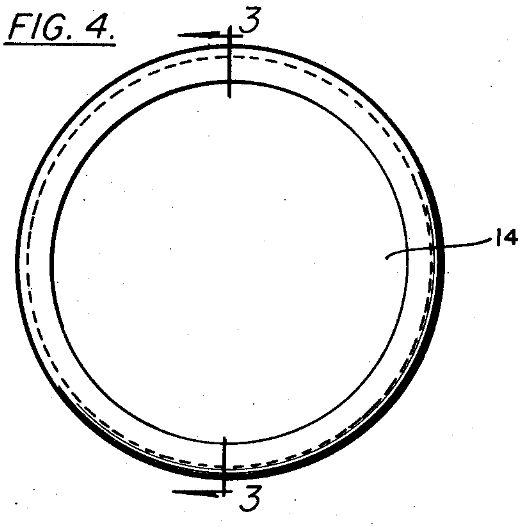
FIG. 5.
| | | EXAMPLES | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| DIMENSIONS | A | 50 | 100 | 50 | 100 | 100 | 200 | 200 | 100 | 100 | 50 | 200 | 50 | 200 | 50 | 150 |
| | B | 5 | 10 | 3 | 10 | 3 | 5 | 10 | 10 | 5 | 5 | 5 | 2 | 10 | 3 | 10 |
| | C | 3 | 3 | 3 | 3 | 3 | 3 | 3 | 3 | 3 | 3 | 3 | 2 | 5 | 3 | 3 |
| | E | 3 | 4 | 3 | 10 | 3 | 5 | 10 | 10 | 5 | 3 | 5 | 2 | 10 | 3 | 4 |
| | F | 36 | 36 | 36 | 36 | 36 | 36 | 36 | 132 | 18 | 18 | 18 | 18 | 132 | 18 | 36 |
| | G | 4 | 4 | 3 | 6.5 | 3 | 4 | 6.5 | 6.5 | 4 | 4 | 4 | 2 | 7.5 | 3 | 4 |
All Dimensions Are In Mils
FIG. 6.
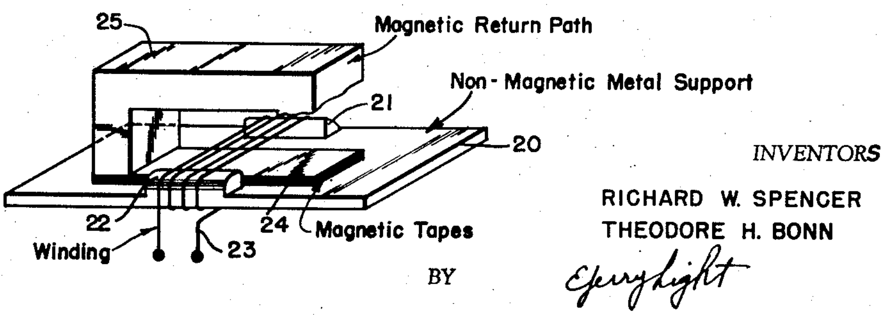
INVENTORS
RICHARD W. SPENCER
THEODORE H. BONN
BY
[signature]
ATTORNEY United States Patent Office 2,963,670
Patented Dec. 6, 1960

2,963,670

SUPPORTS FOR MAGNETIC CORES

Richard W. Spencer and Theodore H. Bonn, Philadelphia, Pa., assignors, by mesne assignments, to Sperry Rand Corporation, New York, N.Y., a corporation of Delaware Filed May 12, 1954, Ser. No. 429,250
11 Claims. (Cl. 336—198)

The present invention relates to core structures for magnetic devices, and, more particularly, relates to a novel supporting structure for tape-wound cores.

In the construction of magnetic amplifiers, and of other types of magnetic devices, it is required that a core exhibiting magnetic properties be provided. Such cores may take a variety of configurations, and one such configuration comprises a pliant tape of magnetic material which is soft and flaccid so as to be non-self-supporting and must be supported by and/or wound upon a supporting structure such as a frame or bobbin. One such well known type of core construction utilizes a bobbin of ceramic material, upon which bobbin a tape of magnetic material is wound in a single wrap or in a plurality of wraps to give a core exhibiting magnetic properties. The tape-wound bobbin is then provided with coils wound in a direction transverse to that of the magnetic tape whereby the overall structure comprises a substantially toroidal magnetic core bearing a winding or windings thereon. This tapewound structure is such that a coil wound upon the resulting toroidal core encloses a total cross sectional area which includes not only the magnetic material of the tape itself, but also the bobbin or frame material as well as air. A current passed through a coil winding so mounted will accordingly induce flux in the magnetic tape, in the air space, and in the bobbin material supporting the magnetic tape. Inasmuch as the flux within the air space, and in the bobbin material encompassed within the winding, tends to modify adversely the flux vs. current curve of the magnetic tape itself, it is desirable to keep the cross sectional area of the air and bobbin material encompassed by a coil winding to a minimum in comparison to the cross sectional area of the magnetic tape material so encompassed.

In the past, when ceramic bobbins have been utilized for supporting a magnetic tape, a practical limit has of necessity been set upon the minimum cross sectional area of that bobbin in order to insure adequate strength. As a result, tape-wound cores utilizing ceramic bobbins have exhibited relatively poor flux vs. current curves because of the large cross-sectional area of the bobbin, especially when the overall flux vs. current curve desired from the combined core structure was to be substantially rectangular.

It is accordingly an object of the present invention to provide a supporting structure for tape-wound cores which supporting structure may be made smaller in cross sectional area than existing ceramic supports.

It is a further object of the present invention to provide a novel support for tape-wound cores whereby the apparent rectangularity of the hysteresis loop of a tape-wound core may be substantially improved.

A further object of the present invention resides in the provision of a non-magnetic metal support or bobbin for tape-wound cores which is cheaper to fabricate and which can be fabricated to closer tolerances than existing ceramic supports for such tape-wound cores.

Still another object of the present invention resides in the provision of a non-magnetic metal support for tape-wound cores which effects a reduction in the inductance of a coil mounted on such a core when the core is saturated, and which gives a lower effective permeability of the magnetic tape material at saturation.

Still another object of the present invention resides in the provision of a non-magnetic metallic support for tape-wound cores whereby the tape-wound core and a magnetic amplifier utilizing such a core can be made materially smaller than with ceramic supports.

In achieving the foregoing objects, we provide a support or bobbin structure fabricated of a non-magnetic metal. The actual metals which may be utilized will be discussed subsequently. The non-magnetic metal bobbin is wound with a strip of magnetic tape exhibiting a desired hysteresis curve, for instance, a substantially rectangular hysteresis loop. One or more coils are then wound on the combined structure of non-magnetic metal bobbin and magnetic metal tape in a direction substantially transverse to the direction of the tape winding. This transverse disposition of magnetic material and coils is preferable since leakage flux is thereby effectively reduced. By using a support or bobbin of non-magnetic metal, the cross sectional area of support material encompassed by the coil or coils may be substantially reduced in comparison with the cross sectional area of magnetic tape material also encompassed by the core, whereby the combined flux vs. current curve of the magnetic tape and supporting structure will approach substantially that of the tape alone. Because of the use of a metallic bobbin or support, the ratio of the cross sectional area of magnetic material enclosed by a winding to the cross sectional area of air and support structure also enclosed by the said winding, is thus much higher than has been possible in the case of tape-wound ceramic bobbins. This most desirable result is achieved without deteriorating the overall strength of the structure; and in addition, inasmuch as the support or bobbin is of a metal, the overall structure is cheaper to fabricate and can be fabricated to closer tolerance and in smaller sizes than has been possible when ceramic bobbins or supports are employed.

The foregoing objects, advantages and structure of the invention will become more readily apparent from the following description and accompanying drawings, in which:

Figure 4 is an end view of a non-magnetic metal bobbin in accordance with the present invention, taken on line 4—4 of Figure 3.

Figure 5 is a table showing possible dimensions for a non-magnetic metal bobbin of the type shown in Figures 3 and 4; and Figure 6 is a representation of another form of non-magnetic metal support which may be utilized in the practice of the present invention.

As will be appreciated from the foregoing discussion, in measuring the hysteresis loop exhibited by a core structure having a coil wound thereon, one measures the total flux in the core produced by the passage of varying currents through the said coil. When the core comprises a support or bobbin having a tape of magnetic metal alloy wound or mounted thereon, the total flux in the core includes the flux in the bobbin or support, in the magnetic metal alloy, and in the air or other spaces encompassed within the winding exclusive of the magnetic metal alloy. When such a tape-wound core is employed in a magnetic device, such as a magnetic amplifier, it is desirable to keep the cross sectional area of the bobbin or other supporting structure at a minimum in order that the flux vs. current curve of the magnetic tape material may be retained, insofar as is possible. When the magnetic tape exhibits a substantially rectangular hysteresis loop, the cross sectional area of the bobbin must be reduced as much as possible in order to increase the amplitude and to decrease the rise time of the output signals of the magnetic amplifier, for instance, for a given input. In the past, the bobbins or supports for such tape-wound cores have been fabricated of a ceramic material, and the best practical ceramic bobbin known thus far has employed a wall thickness of no less than 10 mils, and more often of approximately 15 to 20 mils, in order to assure that the bobbin exhibits enough strength to support the magnetic tape properly.

Figure 1A:
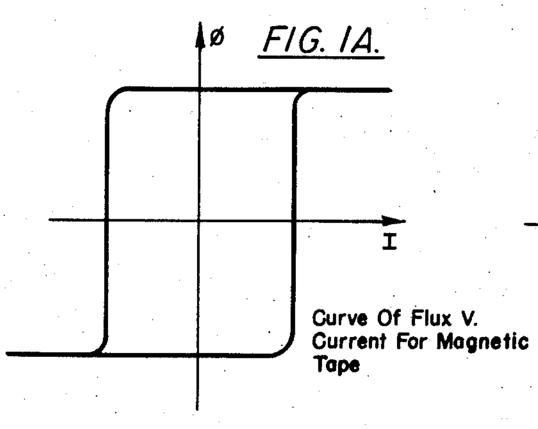
Figure 1A is an idealized graphical representation of the flux vs. current characteristic of a magnetic tape that may be utilized in the practice of the present invention.
Figure 1B:
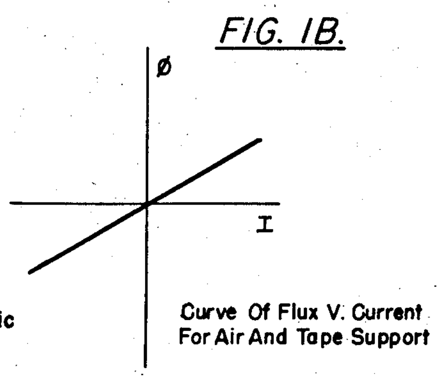
Figure 1B is an idealized graphical representation of a flux vs. current curve of the air and support material in a tape-wound core utilizing a ceramic support.
Figure 1C:
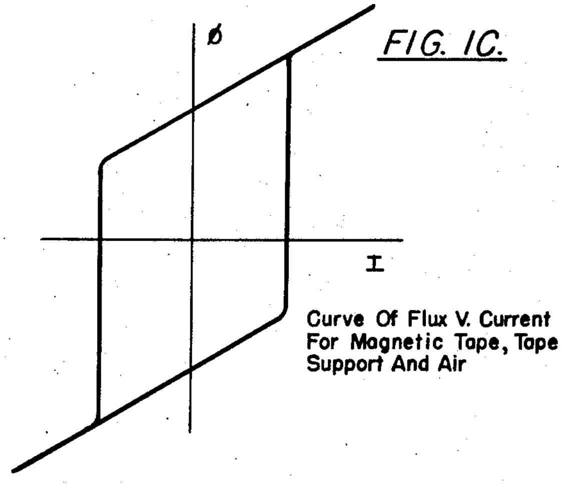
Figure 1C is an idealized graphical representation of the flux vs. current curve of a magnetic core comprising a ceramic support having a magnetic tape material wound thereon.

When one or more wraps of a high permeability magnetc tape such as 4–79 Moly-Permalloy, having a tape thickness of perhaps ⅛ or ¼ mil, are placed upon such a ceramic support, the support material comprises an appreciable portion of the cross-sectional area encompassed by windings placed upon the composite ceramic bobbin-magnetic tape structure. The effect of this may be seen by an examination of Figures 1A, 1B and 1C. As will be seen from Figure 1A, the flux vs. current curve of a high permeability magnetic tape, such as 50–50 nickel iron (Deltamax, Orthonik, etc.) and 4–79 Moly-Permalloy, may be substantially rectangular in configuration. When a magnetic amplifier having a core exhibiting substantially rectangular hysteresis properties is desired, it would of course be desirable to retain the flux vs. current curve shown in Figure 1A. However, as will be seen in Figure 1B, the stray flux included in the bobbin or other supporting structure and in the space within the coil windings exclusive of the magnetic tape, tends to increase with an increase of current applied to a winding on the composite core. Thus, although at magnetic saturation of the magnetic tape an increase in magnetizing force will not materially increase the flux through the tape, there will be an increase in flux through the ceramic bobbin and through the air encompassed within a winding on the composite core. As a result, the total flux linking the windings (Figure 1C) will tend to increase in the region of tape saturation. Therefore, the included bobbin material has the effect of increasing the inductance of the coil at tape saturation.

Tape-wound cores of the type discussed herein may be used in constructing magnetic amplifiers of the type utilizing cores which preferably, but not necessarily, exhibit a substantially rectangular hysteresis loop. These magnetic amplifiers ordinarily comprise such a core having at least one winding thereon to which a series of power pulses are applied having a source (not shown), suitable ones of which are well known in the art. If the amplifier output is taken in series with a winding to which the said power pulses are applied, the magnetic amplifier is termed a "series" pulse type magnetic amplifier. If, on the other hand, power pulses are applied to a first winding on a magnetic core, while the amplifier output is taken across a load connected to a further winding on the said core in parallel with the said first winding, the amplifier is termed a "parallel" pulse type magnetic amplifier.

When a tape-wound core using a ceramic bobbin is employed in a "series" pulse type magnetic amplifier of the type discussed previously, the power pulse voltage tends to be divided between the load and the coil at a time when it is desirable that the power pulse voltage be developed entirely across the load. The voltage developed across the coil is dependent upon the inductance of the coil when the composite core is at magnetic saturation, and this inductance at saturation is, as may be seen from Figure 1C, in turn dependent upon the stray flux present in the air and in the tape support encompassed within the winding. That part of the power pulse voltage which appears across the coil thus represents a reduction in gain and an increase in rise time of the output of the magnetic amplifier.

In "Parallel" pulse type magnetic amplifiers, on the other hand, there is a tendency for "sneak pulses" to develop across the load when a ceramic bobbin or support is utilized for magnetic tape-wound cores. These sneak pulses are pulses appearing at times when there should in fact be no pulse output from the amplifier, and they are developed as a result of the mutual inductance of the windings on the core at tape saturation. Again this undesirable effect results from the stray flux present in the air and in the support structure encompassed within the amplifier winding.

In order to reduce the inductance of the winding with the core at saturation for either type of magnetic amplifier, it is therefore necessary to make the ratio of the cross sectional area of magnetic material enclosed by the winding, to the cross sectional area of air and of supporting structure enclosed by the said winding, as high as possible. With ceramic core supports there is a practical upper limit to this ratio due, for example, to the limited strength of the ceramic supports, and this upper limit in fact encompasses a relatively large amount of air and supporting structure material.

The present invention, however, contemplates the use of a non-magnetic (that is, the permeability of the bobbin material is negligible compared to that of the tape material) metal member as the supporting structure for magnetic material to provide a magnetic core for use in electrical power transformation or electrical signal translation applications including signal amplification, switching, and storage. By using such a metal bobbin or metal support, the support structure itself may be made much thinner than has been possible in the case of ceramics, due to the inherent strength properties of the materials. Consequently, the cross sectional area of support material, as well as the cross sectional area of air encompassed within a coil winding, may be greatly reduced whereby the overall permeability of a composite magnetic material-supporting structure is much lower at tape saturation, and the hysteresis loop of such a composite structure may be made to approach truer rectangularity than has been possible with ceramic bobbins or supports. When the present invention is used in magnetic amplifiers, one may thus achieve an increase in power gain, an increase in the bandwidth, and, therefore, in the figure of merit i.e. the gain-bandwidth product. In pulse transformer applications, the unit may be substantially reduced in size, and a decrease in leakage inductance and in distributed capacity is effected. Again, when the present invention is used in memory units, i.e. when wound cores are used, one achieves an increased ratio of remanent flux density to saturated flux density, which is known in the art as the one-to-zero ratio. It is to be understood that the magnetic material may take a variety of forms such as tapes or layers of sintered ferrites or other magnetic materials. For the sake of simplicity, only the use of magnetic materials in the form of tapes will be described.

Figure 2:
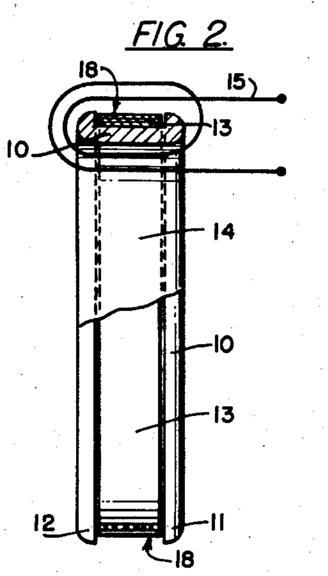
Figure 2 is a representation in partial section of a tape-wound core in accordance with the present invention.

A tape-wound core utilizing a non-magnetic metal bobbin in accordance with the present invention is depicted in Figure 2. This tape-wound core comprises a bobbin 10 having a pair of peripheral flanges 11 and 12 substantially parallel to one another and spaced from one another to define a square cornered recess 18, in which recess one or more wraps of a magnetic metal tape 13 may be wound. The bobbin is hollow in configuration and defines a large central opening 14 whereby once the tape 13 has been wound upon te bobbin 10, the overall structure is substantially toroidal in configuration. Thus, one or more coils 15 may be wound in a direction transverse to the tape 13 through the central opening 14. While we have shown the bobbin 10 to have flanges defining a recess therebetween for the reception of magnetic tape, it will become apparent from the following discussion that, as a practical matter, such flanges need not be provided to effect a recess, and the bobbin or supporting structure may in fact take the form of a non-magnetic metal annulus having magnetic tape wound on the external peripheral surface thereof.

As will be seen from the upper sectioned portion of Figure 2, the winding 15 encompasses both the layer or layers of the tape 13 as well as a portion of the bobbin or supporting structure 10. However, by employing a metal bobbin, the actual cross sectional area of bobbin material encompassed within the winding 15 may be greatly reduced in comparison to the cross sectional area of magnetic material encompassed therein. In this respect, for instance, due to the much greater strength of a metal bobbin when compared to one of the ceramic type, the metal bobbin may exhibit a thickness, for example, of as little as 2 mils while the ceramic bobbin could be no less than 10 mils.

The reduction in cross section of the bobbin 10 through the use of a metallic non-magnetic material, reduces the cross-section of the core structure that is encircled by a coil and that does not saturate. Such a reduction in non-saturable core cross-section materially decreases the inductance of the coil wound around the composite core at saturation, as may be seen from the following formula. The relation between the dimensions of a toroidal core and the inductance of its coil winding is represented by the formula:

$$L=\frac{KN^2A\mu}{l}$$

in which:

$L$=self-inductance of the winding
$K$=a constant appropriate to the units system used
$A$=area of cross section included in winding
$\mu$=magnetic permeability of the core
$l$=magnetic flux path length (means circumference of a toroidal core)
$N$=number of turns of wire in the winding As will be seen from the foregoing formula, reducing the cross sectional area of the total core included within the winding 15 results in a decrease in the inductance of the coil with the core at saturation. Again, reduction of the inductance of the coil at saturation of the tape not only increases the amplitude of the output signal in a magnetic amplifier, for instance, but also decreases its rise time, the decrease in rise time of the output pulse being in turn due to the decrease in the ratio of the reactance of the coil to the impedance of the amplifier load. In the case of magnetic amplifiers, therefore, the present invention increases the figure of merit, the power gain, and the bandwidth of the amplifier. Other advantages have already been pointed out for using the invention in pulse transformers, in memory systems, etc.

In preparing a metal bobbin or support of the type shown in Figure 2 (and in Figures 3 and 4 to be discussed), some of the materials which may be utilized are: 18–8 stainless steel, type 304; Inconel; B-Monel; K-Monel; R-Monel; 315 stainless steel; Nichrome; or metallic titanium. As will be discussed subsequently, the present invention contemplates the placing of magnetic material upon the non-magnetic metal support or bobbin, and the subsequent annealing of the said support and magnetic material together. When this practice is used, the magnetic tape or other material, once wound or otherwise placed on the support or bobbin, need not be handled further and is thus fully protected during later coil winding operations. The bobbin or support material must be so chosen, however, that it will not contaminate the magnetic material during the annealing step. The foregoing bobbin or support materials will comply with this criterion when used with, for instance, 4–79 Moly-Permalloy magnetic tape.

The tape support or bobbin of the present invention may be made in all sizes, and it is to be stressed that the following discussion is not meant to be limitative of actual dimensions which must be employed. However, to stress the very small sizes of tape support which may in fact be effected by practice of the present invention, a tabulation of possible dimensions has been given in Figure 5.

Figure 3:
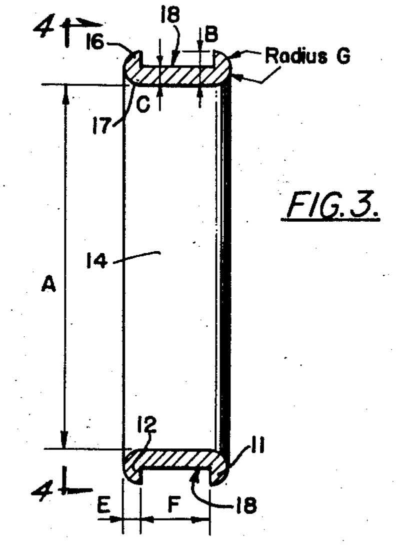
Figure 3 is a cross section of a non-magnetic metal bobbin for tape-wound cores in accordance with the present invention.

Referring now to Figures 3, 4 and 5, it will be seen that a non-magnetic metal bobbin of the type herein involved, comprises flanges 11 and 12, discussed previously, having a thickness E and spaced from one another by a distance F. The actual thickness of the bobbin itself is given by the dimension C, which is a critical dimension, and the flanges 11 and 12 may be recessed by a dimension B—C. In addition, the overall bobbin exhibits a relatively large central opening 14 of a diameter A through which the winding or windings 15 may be passed. As indicated above the inductance L of a winding is a function of the magnetic flux length of the coil which is also dependent upon the mean circumference $l$ of the core. This mean circumference is, in turn, a function of the diameter A. The edges of the flanges 11 and 12 are preferably rounded as at the points 16 and 17, for instance, at a radius G, so that a winding 15 transverse to the magnetic tape and passing through the central opening 14 will not be damaged by sharp corners of the bobbin or supporting structure.

Referring now to Figure 5, it will be seen that the critical dimension, C, namely, the thickness of the bobbin, may be made very much smaller, without detracting from the inherent strength of the composite core structure, than is the case when ceramic bobbins are employed. Thus, the dimension C for the particular examples shown, may range between 2 and 5 mils, and is preferably in the neighborhood of 3 mils. Again, as will be seen from Examples 3, 5, 12 and 14 of Figure 5, for instance, the dimensions C and B may actually be made equal to one another, whereby the overall supporting structure does not in fact exhibit a recessed portion 18 for the reception of the tape but assumes a substantially annular configuration on the periphery of which the tape may be wrapped. From the other examples of B and C dimensions in Fig. 5, it is seen that the thickness C of the support is larger than the thickness B—C of the recess 18, in some examples (1, 6, 9, 10, 11) and, in the others the thickness C is also relatively a substantial amount. Other characteristics of our novel tape supporting bobbin will become apparent from a further study of the tabulation, Figure 5.

In preparing a tape-wound core of the type shown in Figure 2, the following steps may be taken: the bobbin 10 is first fabricated of a non-magnetic metallic material of one of the types listed previously and the bobbin may then be purified by the application of heat at high temperatures, preferably in an atmospheric cycle of wet hydrogen followed by dry hydrogen. This purification step reduces the impurities present in the bobbin itself. The interior portions between the flanges of the non-magnetic metal bobbin, or the exterior peripheral surface of the bobbin upon which the tape is to be wound, is then preferably coated with a non-conducting refractory oxide, or with other appropriate insulating material, by any of the several techniques well known in the art. It may sometimes be desirable to coat all exterior portions of the bobbin or support with such insulating material in order to insulate the exterior of the bobbin from the coil winding or windings, or to decrease the distributed capacitance between the said windings and the metal bobbin. A magnetic tape coated on one or both sides with insulating material is then attached at one of its ends to the bobbin by gluing, spot welding, etc., and the tape is wound in one or more wraps upon the bobbin, as shown in Figure 2. Because of the insulating coating on the tape, the several wraps of magnetic tape are accordingly insulated from one another in the final tape-wound core. The last wrap of the said magnetic tape is fastened by welding it to the previous wrap, by gluing it down, or by wrapping a retaining wire around the tape wraps, and the composite bobbin and tape are then annealed together. The actual temperature, pressure, and atmospheric conditions of anneal will, of course, vary with the precise materials employed for the bobbin structure and for the magnetic tape, and the annealing temperature and/or atmosphere required as well as the time period of anneal will be readily apparent to those skilled in the art for the particular bobbin and tape materials actually employed. In this respect it is most important to note that, inasmuch as the tape and supporting bobbin are annealed together, the materials of each must be so chosen that the metal bobbin will not contaminate the magnetic tape during the anneal, appropriate materials having been listed previously.

After annealing, the composite tape-wound core is tested for its hysteresis properties at both low and high frequencies. A substantially rectangular hysteresis loop is often desired of the tape-wound core, and while the exact loop configuration will vary with the materials used, when ¼ mil and ⅛ mil thick 4–79 Moly-Permalloy, for instance, is used, the test should produce a substantially rectangular hysteresis loop having coercive points at between .05 and .2 oersted. If the composite core meets the foregoing requirements, the coil or coils may then be wound upon the resulting composite toroidal core.

As was mentioned previously, the bobbin flanges may be rounded as at the points 16 and 17 so that no sharp or ragged metal edges will cut through the insulation of a coil wound on the said core, and thereby short circuit the winding to the metal bobbin. One method for removing the sharp edges or burrs of the bobbin is to ball-mill or tumble the bobbin if it is not desired actually to machine the bobbin with curved surfaces as shown. Again, the external surface of the bobbin may be covered with an insulator such as a lacquer or a non-conducting oxide to present a smooth surface for the coil winding. Still another method for overcoming the effects of sharp edges on the bobbin or other support is to use a winding with a heavy insulation, but this may not be practical in all cases, especially if the winding is to consist of a large number of turns.

As will be seen from the foregoing discussion, the present invention provides a bobbin or supporting structure for tape-wound cores fabricated of a non-magnetic metal whereby the thickness of the support may be so materially reduced, without affecting the overall strength of the composite core structure, that the composite tape-wound core exhibits a hysteresis loop substantially the same as that of the magnetic tape alone. Such a result has, heretofore, been impossible to achieve in very small tape-wound magnetic devices utilizing ceramic bobbins or supports. In the past, it has been considered that metallic bobbins, such as those of the present invention, could not be used for one or more of several reasons. These are: (1) that there are losses due to eddy current in the metal bobbin, while no such losses would be present if a ceramic bobbin were employed; (2) that when a metallic bobbin is used, effective short circuited turns may occur when a layer of magnetic metal tape touches both flanges of the metal bobbin; and (3) that short circuits may occur in a winding carried by a composite core employing a metal bobbin or support when the edges of such a metal bobbin or support cut into the insulation of the winding.

With respect to the third disadvantage, it has already been discussed how, by rounding the bobbin edges, by the application of insulating material to the bobbin edges, or by the choice of proper insulation on the coil winding, short circuits between the winding and the metal bobbin may be obviated. With respect to the second disadvantage, the dimension F of our novel bobbin is preferably chosen to be somewhat wider than the magnetic tape wound upon the bobbin so that there will be little possibility of the tape's contacting both sides of the bobbin and shorting thereto. Finally, with respect to the first disadvantage, that is that eddy currents will effect losses in the bobbin, it has been found that these losses due to eddy current in the metal bobbin are in fact negligible. This may be seen from the following discussion.

Inasmuch as the metal bobbin of the invention has a very small thickness (dimension C) as compared to the bobbin radius (substantially A/2), the overall core may be considered as a flat sheet. Eddy current losses in sheets are given by the following equation:

$$pe=\frac{K(afB_m)^2}{\rho}\text{ watts/cc.}$$

where:

$a$=sheet thickness in centimeters
$f$=frequency expressed in cycles per second
$B_m$=maximum flux density expressed in gauss
$\rho$=resistivity of the sheet expressed in ohm/cm.², and
$K$=a constant of proportionality appropriate to the units used Assuming a constant permeability $\mu$, and a sheet area equal to A and substituting $\mu$H for $B_m$, the power loss due to eddy currents for the entire sheet is given by $$P_e=peaA=\frac{K(af\mu H_m)^2\cdot aA}{\rho}$$

and simplifying, $$P_e=K(fH_m)^2\frac{a^3\mu^2}{\rho}\cdot A$$

If the ratio of the eddy current losses in the tape to the eddy current losses in the bobbin is high, then the power dissipated in the bobbin may be considered negligible.

$$\frac{P_e\text{ tape}}{P_e\text{ bobbin}}=\frac{K(fH_m)^2\left(A\cdot\frac{a^3\mu^2}{\rho}\right)\text{ tape}}{K(fH_m)^2\left(A\cdot\frac{a^3\mu^2}{\rho}\right)\text{ bobbin}}$$

and simplifying, since K, $f$, A, and $H_m$ are substantially the same for tape and bobbin, $$\frac{P_e\text{ tape}}{P_e\text{ bobbin}}=\frac{\left(\frac{a^3\mu^2}{\rho}\right)\text{ tape}}{\left(\frac{a^3\mu^2}{\rho}\right)\text{ bobbin}}$$

Assuming that we use only one wrap of ⅛ mil 4–79 Moly-Permalloy tape having the following typical characteristics:

$\rho=57\times10^{-6}$ ohm=cm.
$\mu=1000$ (average over entire hysteresis loop)

and assuming, also, that the tape is wound on a 5 mil, 18–8 stainless steel bobbin having the following typical characteristics:

$\rho=80\times10^{-6}$ ohm=cm.
$\mu=1$ the preceding ratio will be:

$$\frac{P_e \text{ tape}}{P_e \text{ bobbin}} \approx 22/1$$

In actual practice, this ratio may even be higher, as the wall thickness of the bobbin may only be 2 mils and several wraps (4 or 5) of Permalloy tape may be used.

As will be seen from the foregoing development, therefore, the eddy current loss in the bobbin is in fact negligible with respect to the eddy current losses in the non-magnetic tape itself, and therefore when the non-magnetic metal bobbins of the present invention are used, this factor can no longer be considered a disadvantage of the bobbin construction.

It must be understood that the present invention may be applied to tape supports taking other configurations. Referring, for instance, to the device shown in Figure 6, it will be seen that instead of assuming a bobbin configuration, the support may comprise a substantially flat metal base 20 having upstanding surfaces 21 and 22 thereon around which surfaces a winding or windings 23 may be placed. Prior to placing the coil windings on the non-magnetic base structure 20—21—22 shown in Figure 6, one or more magnetic tapes 24 may be stacked upon the surface 20 and affixed thereto between the upstanding surfaces 21 and 22, as shown, and the combined structure annealed. After placing a winding or windings on this structure a magnetic return path 25 of a ferrite or other appropriate material, may then be placed upon and affixed to the stacked tapes 24.

In summary, therefore, the present invention contemplates the provision of a metal support for magnetic-material cores, which metal support is fabricated of materials which are non-magnetic in nature, and which materials further are preferably so chosen that they will not contaminate the magnetic tape during annealing of the combined magnetic material and support structure.

While there have been disclosed several particular materials which may be employed, as well as particular support configurations and support dimensions, it must be stressed that these are illustrative only and that other materials, configurations and dimensions will readily be apparent to those skilled in the art and, therefore, fall within the scope of the present invention. In this respect it must also be stressed that while annealing has been disclosed it may be found to be unnecessary with certain materials and so may be omitted.

Having thus described our invention, we claim:

1. A magnetic core structure comprising a support member fabricated of a non-magnetic metal, said support member including a pair of spaced substantially parallel flanges having smoothly curved external surfaces, said flanges being fabricated of said non-magnetic metal, an elongated layer of magnetic material wrapped around and supported by said support member between said flanges, said layer of magnetic material being spaced from at least one of said flanges, an insulating coating interposed between said layer of magnetic material and said support member, said insulating coating being fabricated of a non-conducting refractory oxide, and an electrical conductor wound about said support member and said magnetic material, adjacent the smooth curved surfaces of said flanges, in a direction substantially transverse to the direction of elongation of said magnetic material.

2. A magnetic structure having a substantially rectangular hysteresis characteristic comprising a metallic support member of relatively low permeability material, a layer of magnetic material of relatively high permeability when unsaturated and having a substantially rectangular hysteresis characteristic, said layer being mounted on said support member, and a coil wound around said layer and said support member and substantially in contact with said layer at its peripheral portion so that the cross-sectional area within said coil is small, the relative cross-sectional area of said support member being small so as to produce a small inductance in said coil at substantial saturation of said layer.

3. A magnetic structure having a substantially rectangular hysteresis characteristic comprising a relatively non-magnetic metallic annular support member, and a thin layer of magnetic material having a rectangular hysteresis characteristic mounted on said support member, a coil wound around said support member and said layer, said magnetic layer having its outer periphery uncovered so that said coil is substantially in contact therewith, the dimensions of said support member and said magnetic layer being such that the cross-sectional area of said support member forms a substantial portion of said structure, the material of said non-magnetic member being such and the cross-sectional thickness of said support member being small so that eddy current losses in said support member are negligible relative to those in the magnetic material.

4. In a magnetic amplifier having a substantially saturable magnetic core structure, winding means linked thereto, and means for applying signals to said winding means to operate said core structure in substantial saturation, an improved magnetic core structure to be used in said amplifier, said core structure comprising a relatively non-magnetic metallic support member of annular shape, and a thin layer of magnetic material mounted around said support member, said winding means being directly adjacent the outer surface of said layer, the relative cross-sectional areas of said support member and said magnetic material being such that the inductance of said winding means is small when the core is operated at substantial saturation.

5. The magnetic amplifier core structure of claim 4, wherein said thin layer of magnetic material exhibits a rectangular hysteresis characteristic, and the composite core comprising said magnetic tape and said non-magnetic support member exhibits a substantially rectangular hysteresis characteristic.

6. A magnetic core structure comprising an annular support member fabricated of a non-magnetic metal, said support member having a pair of parallel flanges around the outer periphery, a layer of magnetic material comprising at least one wrapping of a magnetic tape around said support member and between said flanges, and an insulating coating between said magnetic tape and said support member, said insulating coating comprising an insulating refractory oxide.

7. A magnetic core structure having a substantially rectangular hysteresis characteristic comprising an annular support member fabricated of a non-magnetic stainless-steel, said support member includes a pair of spaced flanges, said flanges being fabricated of said non-magnetic stainless-steel, said flanges defining a recess around the outer periphery of said support member, and a layer of magnetic material having a hysteresis characteristic exhibiting substantial rectangularity, said layer being disposed between said flanges and wrapped around the outer periphery of said support member so that said core structure exhibits a hysteresis characteristic similar to that of said layer.

8. A magnetic core structure comprising an annular support member fabricated of a non-magnetic stainless-steel, said support including a pair of spaced flanges, said flanges being fabricated of said non-magnetic metal and defining a channel-like recess around the outer periphery of said support member, a layer of magnetic material wrapped around the outer periphery of said support structure and disposed between said flanges, said magnetic material being annealed, winding means linked to the combination of said support structure and said magnetic layer and substantially in contact with said layer at the periphery thereof, and terminal means for applying signals to said winding means.

9. A magnetic core structure comprising an annular support member fabricated of a non-magnetic stainless steel, said support including a pair of spaced flanges, said flanges being fabricated of said non-magnetic metal and defining a channel-like recess around the outer periphery of said support member, a layer of thin, flimsy magnetic material having a rectangular hysteresis loop and formed of a plurality of wrappings wrapped around the outer periphery of said support structure and disposed between said flanges out of contact with at least one thereof, the innermost of said wrappings being attached to said support member and the outermost being attached to the adjacent wrapping, said magnetic material being annealed, said stainless steel being such as not to contaminate said magnetic material during annealing, a non-conducting refractory oxide layer between said support member and said layer, winding means linked to the combination of said support structure and said magnetic layer and substantially in contact with said layer at the periphery thereof, and terminal means for applying signals to said winding means.

10. A magnetic structure having a substantially rectangular hysteresis characteristic comprising a non-magnetic metallic bobbin-like support member, and a plurality of wrappings of magnetic material having a rectangular hysteresis characteristic attached at one end thereof and wrapped around said support member, said magnetic material being pliant so as to be non-self-supporting, the cross-sectional dimensional area of said support member forming a substantial portion of the overall cross-sectional area of said structure.

11. In a magnetic core structure, the combination of an annular bobbin-like support structure, said support structure being fabricated of a non-magnetic refractory stainless-steel, a layer of magnetic material, said layer comprising a plurality of wrappings of magnetic tape that is pliant so as to be non-self-supporting, said wrappings being wrapped around the periphery of said support structure, the thickness of said steel support structure being small so that eddy current losses are relatively negligible, said magnetic tape being annealed and having a rectangular hysteresis characteristic, and means including a winding linked to said support structure and to said wrappings for changing the flux in said wrappings.

References Cited in the file of this patent

UNITED STATES PATENTS

| | | |
|---|---|---|
| 605,194 | Bellman et al. | June 7, 1898 |
| 1,680,910 | Pfiffner | Aug. 14, 1928 |
| 1,978,568 | Crossley et al. | Oct. 30, 1934 |
| 2,416,989 | Gauthier | Mar. 4, 1947 |
| 2,469,808 | Aske | May 10, 1949 |
| 2,478,030 | Vienneau | Aug. 2, 1949 |
| 2,568,979 | Barnhart et al. | Sept. 25, 1951 |
| 2,569,468 | Gaugler | Oct. 2, 1951 |
| 2,623,920 | Ford | Dec. 30, 1952 |

OTHER REFERENCES

Article "Special Magnetic Alloys and Applications," pp. 1–3, reprinted from the September 1948 issue of Electrical Engineering.

Catalogue TWC–100, "Performance-Guaranteed Tape Wound Cores," by Magnetics Inc., February 1954, pp. 2 and 3.